No. 669,064. Patented Feb. 26, 1901.
L. W. COLLINS.
SECONDARY BATTERY.
(Application filed July 7, 1899. Renewed Jan. 28, 1901.)
(No Model.)
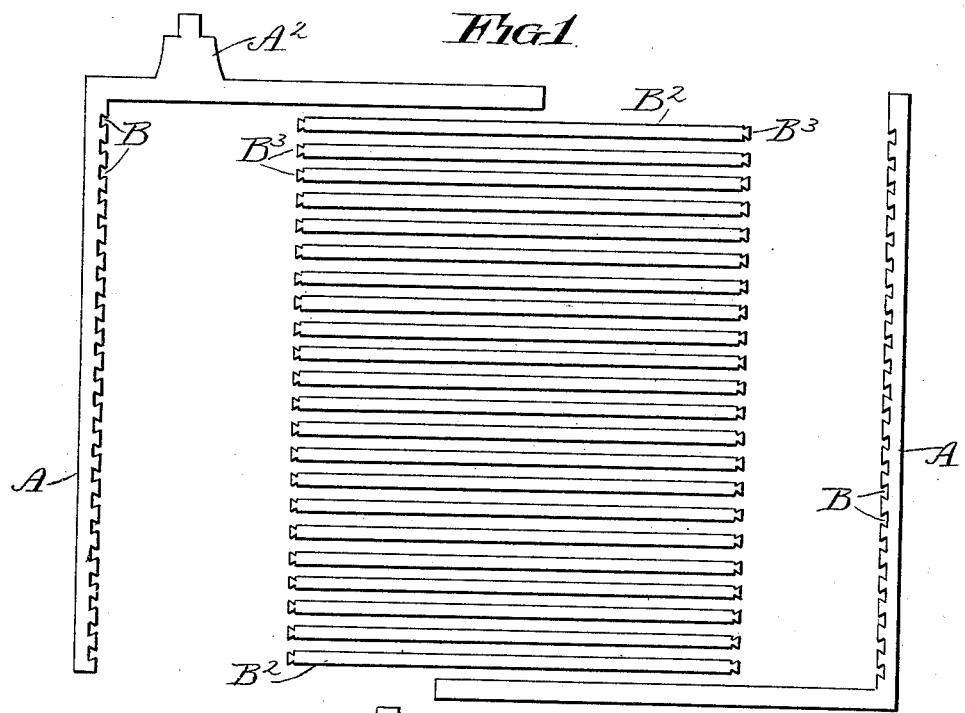
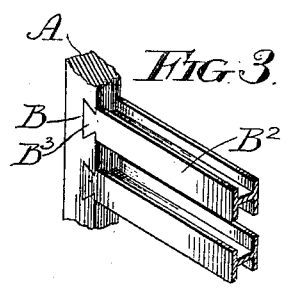
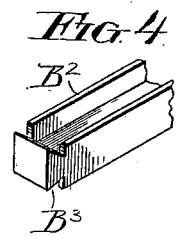
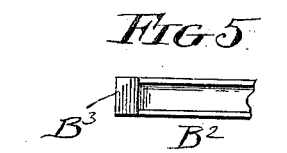
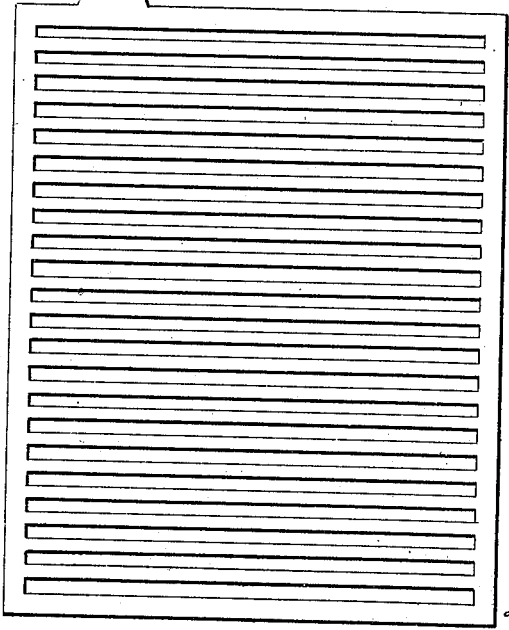
Witnesses:
Ira D. Perry
J. B. Weir
Inventor
Leslie W. Collins,
By Chas. E. Buckley
Atty.
THE NORRIS PETERS CO., PHOTO-LITHO., WASHINGTON, D. C.

UNITED STATES PATENT OFFICE.

LESLIE W. COLLINS, OF CHICAGO, ILLINOIS, ASSIGNOR TO BENJAMIN W. McCAUSLAND, OF SAME PLACE.

SECONDARY BATTERY.

SPECIFICATION forming part of Letters Patent No. 669,064, dated February 26, 1901.

Application filed July 7, 1899. Renewed January 28, 1901. Serial No. 45,108. (No model.)

*To all whom it may concern:*

Be it known that I, LESLIE W. COLLINS, a citizen of the United States of America, and a resident of Chicago, Cook county, Illinois, have invented a certain new and useful Improved Secondary Battery, of which the following is a specification.

My invention relates to certain improvements in electrodes for electric storage or secondary batteries.

In the well-known Faure type of storage battery lead oxid in the form of a paste or cement is applied to a supporting grid or frame of conducting material. My invention has for its object the construction and assembling of the parts of this grid or frame in a more expeditious manner and at less expense and to join the several parts firmly and intimately together.

To accomplish these ends, my invention consists in certain features about to be described, reference being now had to the accompanying drawings, in which—

Figure 1 is a side view showing the several parts of the grid or frame separated and in position about to be joined. Fig. 2 is a side view of a completed grid ready for the application of the active material. Fig. 3 is a perspective view of a fragment of one side of the frame with the containing-bars joined thereto by dovetail mortise-joint. Fig. 4 is a perspective view of the ends of one of the ribs. Fig. 5 is a fragmentary plan view of one of the ribs.

I will describe the manner in which the grid or support for the active material or material to become active is made or built up.

As shown in Fig. 1, the rim portion A of the grid is made in two parts, one of which carries the terminal $A^2$. These rim portions A A are cut or formed along their inner edge with the recess or female member B of a mortise-joint, which will be described. The containing bars or strips $B^2$ are provided on their ends with the tongues $B^3$ of the mortise-joint connection. The tongues $B^3$ are adapted to engage in the recesses B, and thereby connect the strips $B^2$ to the side rim A, the two portions of which may be burned or fused together at the point of junction between them. I may, however, deem it advisable to form the rim portion A in one piece, in which event the strips $B^2$ are adjusted in position by slipping the tongues $B^3$ sidewise into the recesses B. When the mortise-joint connection is established between the strips $B^2$ and the rim A, said strips are burned or fused into a solid connection, thus producing the complete grid, as shown in Fig. 2, with the strips for confining the active material or material to become active securely in position and practically producing a solid grid made entirely in one piece. By this means I am enabled to produce a grid at much less expense and which permits the stamping of the parts, if found desirable. The complete structure is solid and firm, with the confining-strips properly distanced from one another. When the separate parts are assembled and fused in the well-known way, the joints are practically formed into solid integral connections, thus producing a practically solid integral grid.

Figs. 3, 4, and 5 illustrate in detail portions of the horizontal bars, which are shown to have a transverse section similar to an I-beam turned on its side, wherein the flanges thereof are vertical to the horizontal web that joins them. The spaces between the webs of the adjacent bars are to be filled with active material or material to become active, such as an oxid of lead or the like, and the flanges which are flush with the face of the plate form keys for retaining the active material in position between the respective webs of the bar.

I have found by experience that when active material is placed in small interstices of a plate, such as when it is forced into the openings in a cross-grated plate, owing to the lack of resilience of the lead of which the frame is composed, there is no elasticity of the supporting-frame to compensate for the expansion and contraction of the active material, which it undergoes while the battery is being charged or discharged. The result of the inactivity of the metal frame is to permit of the very deleterious process known as "sulfating," which takes effect between the billets of active material and the surface of the supporting-frame. I have also found that when the active material is placed in strips between long parallel bars the metal frame will readily respond to the changes in the active material occasioned by expansion and contraction and will preserve an intimate contact therewith, and the process of sulfating and "buckling" is prevented.

Having described my invention, what I claim as new therein, and desire to secure by Letters Patent of the United States, is—

1. A secondary-battery grid, or support, comprising an outer rim or frame, transversely-extended confining-strips therein, spacing notches or indentations in the said frame with which the ends of the said strips register, and a welded or fused joint between the said frame and strips, substantially as set forth.

2. A secondary-battery grid, or support, comprising a two-part outer rim or frame, spacing notches, or indentations in the said frame, transversely-extended confining-strips the ends of which engage with the notches in the said frame, and a solid, a welded or fused joint, substantially as set forth.

3. A secondary-battery grid, or support comprising an outer frame provided with notches, or indentations on opposite sides thereof, parallel strips or webs extending between the said sides of the said frame engaging with the said notches and joined integrally therewith, and flanges, or fins, extending from each side of the said webs and flush with the face of the said grid, substantially as set forth.

Signed by me at Chicago, Cook county, Illinois, this 28th day of June, 1899.

LESLIE W. COLLINS.

Witnesses:
   CHAS. C. BULKLEY,
   L. M. BULKLEY.